June 30, 1964
R. G. WELLS
3,139,175
TROLLEY BRACKET
Filed Nov. 20, 1962
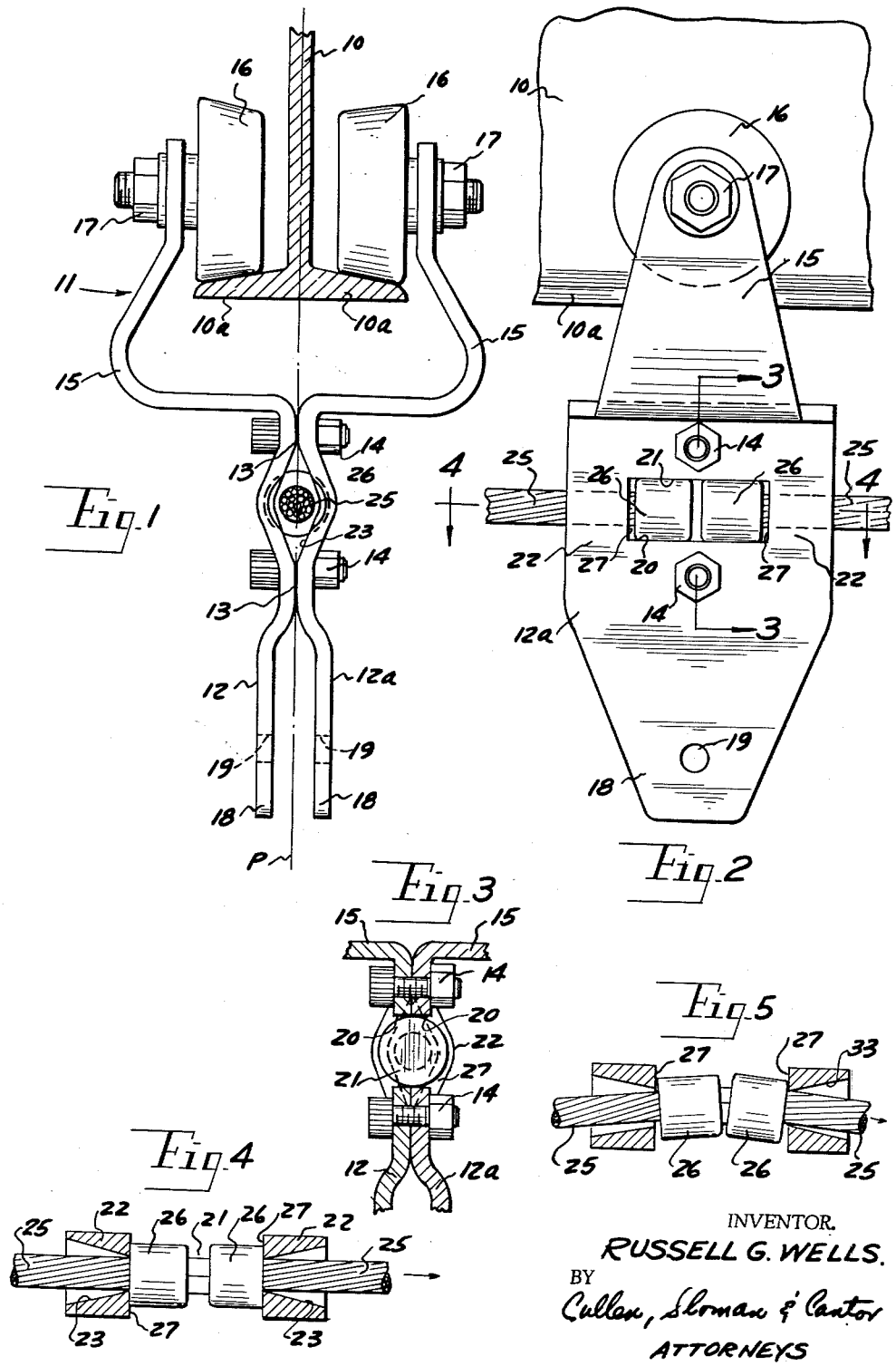
INVENTOR.
RUSSELL G. WELLS.
BY
Cullen, Sloman & Cantor
ATTORNEYS

United States Patent Office 3,139,175
Patented June 30, 1964

3,139,175
TROLLEY BRACKET
Russell G. Wells, Southfield, Mich., assignor to Dearborn Fabricating & Engineering Co., Detroit, Mich., a corporation of Michigan
Filed Nov. 20, 1962, Ser. No. 238,967
1 Claim. (Cl. 198—177)

This invention relates to a trolley bracket useful in trolley type conveyors.

It is an object of this invention to provide a trolley bracket having means for interconnecting adjacent trolley brackets mounted on a single rail, the connecting means being so formed as to easily permit the adjacent trolleys to turn around curves and corners of the rail.

A further object of this invention is to provide a trolley bracket which is symmetrically formed so that loads are evenly distributed upon a pair of suspension rollers, thus facilitating movement upon the conveyor support rail and avoiding sticking or jamming of the brackets.

These and other objects and advantages of this invention will become apparent upon reading the following description, of which the attached drawings form a part.

In these drawings:

FIG. 1 is an end view of a single trolley bracket mounted upon a support rail.

FIG. 2 is a front elevational view of the trolley bracket mounted on the rail.

FIG. 3 is a cross-sectional view taken in the direction of arrows 3—3 of FIG. 2.

FIGS. 4 and 5 are views taken in the direction of arrows 4—4 of FIG. 2 and showing two different positions of the inter-connecting cable, however, with the fastener bolts omitted for clarity of illustration.

FIGS. 1 and 2 illustrate a portion of a conventional conveyor trolley support beam 10 which may be in the form of an I-beam or the like, having lower horizontal flanges 10a. These flanges carry a large number of trolley brackets 11 to which are connected various items to be conveyed.

The trolley bracket 11 is formed of two identical, but opposite, plates 12 and 12a symmetrically arranged on opposite sides of a vertical plane P, and having upper and lower flattened central portions arranged in face to face contact at 13 and interconnected by bolts 14 or the like. The upper ends of the plates are bent into legs 15 which form an upwardly opening U-shape, within which are mounted a pair of rollers 16 rotatably supported on the legs by axle bolts 17. The rollers 16 ride upon the flanges 10a of the support beam 10.

The lower ends of each of the plates are bent apart into legs 18 forming a lower U-shape. An opening 19 is formed in each leg 18 to receive connectors, such as hooks, from which items to be conveyed may be suspended.

A horizontally elongated slot 20 is formed in each plate, midway between the bolts 14. The two slots being aligned to form a central opening 21. The area 22 of each plate located between the ends of the slots and the vertical edges of the plate, are outwardly bent or bowed to form tubular-like throats or passageways 23 (see FIG. 1). Extending through each of said throats 23 is the end of a relatively stiff, wire cable 25 having a head or cylinder enlargement 26 joined thereto. The enlargements 26 are located within the opening 21 and are of sufficient diameter to extend perpendicularly outwardly of the plates and engage the shoulders 27 formed by the inner ends of the throats to prevent their removal from the opening. While the enlargements substantially fill the opening, they are loose therein to provide some play in the axial direction.

As shown in FIGS. 4 and 5, the throats or passageways are horizontally flared outwardly. Thus, when a number or trolley brackets are interconnected by the means above described, they may turn around corners or bends of the support beam easily without material wear between the cable and plates since the stiff cables 25 will pivot horizontally relative to their respective brackets, as well as bend somewhat. This also eliminates the possibility of the brackets jamming on the rail when they turn around curves and corners.

This invention may be further developed within the scope of the following claim. Accordingly, it is desired that the foregoing description be read as being merely illustrative of an operative embodiment of this invention and not in a strictly limited sense.

I now claim:

A trolley bracket comprising a pair of flat, vertically arranged plates fastened together in face to face contact by an upper fastener and a lower fastener; a roller mounting portion formed on the upper end of each of the plates and having a support roller mounted thereon, and a load support portion located on the lower end of one of the plates; each plate having a single, horizontally elongated, rectangular shaped slot located midway between the two fasteners and midway between the two side edges of the plate, the two slots being aligned to form a single, horizontally elongated opening through the two plates, with the vertical ends of the opening each defining a shoulder; each of the plate portions located between said shoulders and plate side edges being outwardly bowed relative to its opposite plate portion to form a horizontally axised passageway opening into each of said shouders, with the passageways being horizontally and axially aligned with the opening; the adjacent passageway defining wall surfaces of each plate being outwardly and horizontally flared relative to each other so that the passageways are each of a substantially truncated conical shape, with their smaller bases coinciding with their respective adjacent shoulders and their larger bases coinciding with their respective plate side edges; and with their smaller bases being considerably smaller in diameter than the height of the opening; a pair of horizontally arranged cylinders fitted in said opening and each cylinder having a flat, shoulder contacting end, with the combined lengths of the cylinders being considerably less than the horizontal length of said opening and the diameters of the cylinders being approximately equal to the height of the opening wherein said cylinders are held against vertical movement relative to said slot; each passageway having an end of a stiff cable extending therethrough, with each of said cables being of a diameter considerably less than the diameter of said smaller bases and each cable being axially aligned with and permanently connected to one of said cylinders; whereby the cables are each loosely fitted in their passageways and the cylinders are radially movable in a horizontal direction, and are axially movable towards and away from their respective adjacent shoulders.

References Cited in the file of this patent
UNITED STATES PATENTS

| | | |
|---|---|---|
| 2,855,090 | Zebley | Oct. 7, 1958 |
| 2,869,709 | Zebley | Jan. 20, 1959 |